United States Patent
Bruchmann et al.

(10) Patent No.: US 7,645,855 B2
(45) Date of Patent: Jan. 12, 2010

(54) HIGHLY FUNCTIONAL, HIGHLY BRANCHED POLYUREAS

(75) Inventors: Bernd Bruchmann, Freinsheim (DE); Jean-Francois Stumbe, Strasbourg (FR); Eva Wagner, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 393 days.

(21) Appl. No.: 10/578,186

(22) PCT Filed: Nov. 4, 2004

(86) PCT No.: PCT/EP2004/012468
§ 371 (c)(1),
(2), (4) Date: May 4, 2006

(87) PCT Pub. No.: WO2005/044897
PCT Pub. Date: May 19, 2005

(65) Prior Publication Data
US 2007/0083030 A1    Apr. 12, 2007

(30) Foreign Application Priority Data
Nov. 4, 2003    (DE) ................ 103 51 401

(51) Int. Cl.
*C08G 71/02*    (2006.01)
(52) U.S. Cl. ................ 528/370; 528/371
(58) Field of Classification Search ............... 528/370, 528/371
See application file for complete search history.

(56) References Cited
U.S. PATENT DOCUMENTS

| | | | |
|---|---|---|---|
| 2,682,525 A * | 6/1954 | Jackson ............ | 525/329.1 |
| 4,596,866 A | 6/1986 | Jackson et al. | |
| 4,876,317 A * | 10/1989 | Blackmon et al. ............ | 525/433 |
| 7,176,271 B2 * | 2/2007 | Bruchmann ................... | 528/45 |
| 2002/0161113 A1 | 10/2002 | Dvornic et al. | |

FOREIGN PATENT DOCUMENTS

| | | |
|---|---|---|
| DE | 100 30 869 | 1/2002 |
| EP | 1 026 185 | 8/2000 |
| WO | 98/50453 | 11/1998 |
| WO | 98/52995 | 11/1998 |
| WO | WO 03/066702 A1 * | 8/2003 |

OTHER PUBLICATIONS

Ambade, Ashootosh V. et al., "An Efficient Route for the Synthesis of Hyperbranched Polymers and Dendritic Building Blocks Based on Urea Linkages", Journal of Polymer Science: Part A: Polymer Chemistry, vol. 39, pp. 1295-1304, 2001.

Kumar, Anil et al., "Novel Hyperbranched Polymer Based on Urea linkages", Chem. Commun., pp. 1629-1630, 1998.

Kumar, Anil et al., "Dendritic and Hyperbranched Polymers Based on Urea Linkages", American Chemical Society, vol. 39, No. 2, pp. 619-620, Aug. 1998.

Rannard, Steve et al., "The Use of In-Situ Selective Activation of AB2 Monomers in Hyperbranched Polymer Synthesis Initial Results of A Diverse Chemistry", Polymeric Materials: Science & Engineering, vol. 84, No. 2, 2001.

* cited by examiner

*Primary Examiner*—Rabon Sergent
(74) *Attorney, Agent, or Firm*—Oblon, Spivak, McClelland, Maier & Neustadt, L.L.P.

(57) ABSTRACT

A process for preparing high-functionality highly branched polyureas which comprises reacting one or more carbonates with one or more amines having at least two primary and/or secondary amino groups, at least one amine having at least three primary and/or secondary amino groups.

9 Claims, No Drawings

HIGHLY FUNCTIONAL, HIGHLY BRANCHED POLYUREAS

The present invention relates to specifically synthesized high-functionality highly branched polyureas based on carbonates and polyamines and to a process for preparing them.

The high-functionality highly branched polyureas of the invention can be used for instance as adhesion promoters and thixotropic agents or as building blocks for preparing paints and varnishes, coatings, adhesives, sealants, castable elastomers or foams.

Polyureas are customarily obtained by reacting isocyanates with water or isocyanates with amines. The reactions are very exothermic and products are obtained which are nonuniform and have a high degree of crosslinking. Consequently polyureas are generally insoluble in known organic solvents. On this point see also Becker/Braun, Kunststoff-Handbuch Volume 7, Polyurethane, Hanser-Verlag 1993.

High-functionality polymers of defined construction which contain urea groups are known.

WO 98/52995 describes dendrimeric highly branched polyurethane polyols which can be prepared using isocyanates having a primary and a tertiary NCO group and dialkanolamines by means of a shell-type (generational) synthesis. The synthesis produces urea urethanes with a distinct preponderance of urethane groups in the molecule (ratio of urea groups to urethane groups 1:2).

EP-A-1 026 185 describes the preparation of highly branched polyurethane polyols which without employing protecting group techniques are prepared by specific synthesis by means of $AB_2$ and $AB_3$ structures, utilizing intramolecular differences in reactivity among the reactants. The reaction is terminated by adding one of the two reactants in excess. Here too use is made of amino alcohols, and again urethane groups are dominant among the linking groups (ratio of urea groups to urethane groups=1:2 or 1:3).

DE-A-100 30 869 describes the preparation of polyfunctional polyisocyanate polyaddition products for which isocyanate-reactive components specified include amino alcohols and also diamines and triamines as urea formers. These amines, however, are used in conjunction with alcohols, since the reaction of diisocyanate with diamine or triamine alone, owing to its exothermic nature, is difficult to control.

High-functionality hyperbranched polyureas are described by A. Kumar and E. W. Meijer, Chem. Commun. 1629 (1998), and by the same authors in Polym. Prep. 39, (2), 619 (1998). The products described therein are prepared from 3,5-diaminobenzoic acid (1), which over a number of reaction steps is converted into the amine-blocked carboxylic azide (2). Subsequently the protecting groups are eliminated and the 3,5-diaminobenzoyl azide is heated to form a polyurea, with elimination of nitrogen. The products are described in the cited publications as being extremely difficult to dissolve.

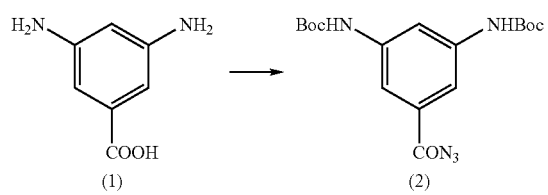

A. V. Ambade and A. Kumar, J. Polym. Sci. Part A, Polym. Chem. 39, 1295-1304 (2001) describe high-functionality highly branched polyureas which are prepared analogously from 3,5-diaminobenzoyl azide or from 5-aminoisophthaloyl azide (3).

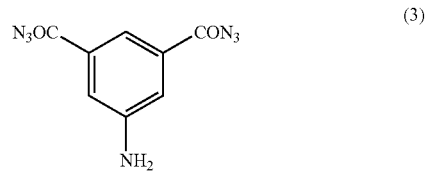

The products obtained are likewise described by the authors as being insoluble in all customary solvents.

The azide route is unattractive not least from a technical standpoint, owing to the following considerations:
- the multistage synthesis employing protecting group techniques gives rise to high production costs;
- owing to the azide reactivity only aromatic area products can be prepared;
- handling of aromatic carboxylic azides or aromatic amines on a large scale is objectionable on safety grounds.

High-functionality hyperbranched aliphatic polyureas can also be prepared in accordance with WO 98/50453 or with S. Rannard and N. Davis, Polym. Mat. Sci. Eng. 84, 2 (2001). According to the process described therein triamines having three primary or two primary and one secondary amine functions, e.g., trisaminoethylamine or dipropylenetriamine, are reacted with carbonyldiimidazole as a phosgene analog compound. The initial products are imidazolides, which then react further intermolecularly to form the polyureas. The disadvantage of this synthesis is on the one hand the comparatively high price of carbonyldiimidazole and on the other the fact that the resultant products always contain terminal imidazolide groups, which are labile and have to be converted into urea groups in a hydrolysis step.

US 2002/0161113 A1 describes the preparation of hyperbranched polyureas by reacting polyamines with polyisocyanates. The reactants are combined at a temperature of −78° C. This process is very complex for production of the products on the industrial scale.

The object underlying the invention was therefore to provide aliphatic and aromatic high-functionality highly branched polyureas whose structures are readily adaptable to the requirements of the application and which on the basis of their defined structure have advantageous properties, such as high functionality, high reactivity, and effective solubility, and also to provide an easily implemented process for preparing the high-functionality highly branched polyureas.

This object is achieved through a process for preparing high-functionality highly branched polyureas which involves reacting one or more carbonates with one or more amines having at least two primary and/or secondary amino groups, at least one amine having at least three primary and/or secondary amino groups.

The invention also provides the polyureas thus prepared themselves.

Suitable carbonates are aliphatic, aromatic or mixed aliphatic-aromatic carbonates; preference is given to aliphatic carbonates such as dialkyl carbonates having $C_1$-$C_{12}$ alkyl radicals. Examples are ethylene carbonate, 1,2- or 1,3-propylene carbonate, diphenyl carbonate, ditolyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, diheptyl carbonate, dioctyl carbonate, didecyl carbonate or didodecyl carbonate. Carbonates used with particular preference are dimethyl carbonate, diethyl carbonate, dibutyl carbonate, and diisobutyl carbonate.

Carbonates can be prepared for example by reacting the corresponding alcohols or phenols with phosgene. Additionally they can be prepared by oxidatively carbonylating the corresponding alcohols or phenols with CO in the presence of noble metals, oxygen or $NO_x$. Methods of preparing carbonates are described for example in Ullmann's Encyclopedia of Industrial Chemistry, 6th Edition, 2000 Electronic Release, Wiley-VCH.

In accordance with the invention the carbonates are reacted with one or more amines having at least two pro and/or secondary amino groups, at least one amine having at least three primary and/or secondary amino groups. Amines having two primary and/or secondary amino groups produce a chain extension within the polyureas, whereas amines having three or more primary or secondary amino groups are responsible for the branching in the resultant high-functionality, highly branched polyureas.

Suitable amines having two primary or secondary amino groups which axe reactive toward a carbonate or carbamate group are for example ethylenediamine, N-alkylethylenediamine, propylenediamine, 2,2-dimethyl-1,3-propylenediamine, N-alkylpropylenediamine, butylenediamine, N-alkylbutylenediamine, pentanediamine, hexamethylenediamine, N-alkylhexamethylenediamine, heptanediamine, octanediamine, nonanediamine, decanediamine, dodecanediamine, hexadecanediamine, tolylenediamine, xylylenediamine, diaminodiphenylmethane, diaminodicyclohexylmethane, phenylenediamine, cyclohexylenediamine, bis(aminomethyl)cyclohexane, diaminodiphenyl sulfone, isophoronediamine, 2-butyl-2-ethyl-1,5-pentamethylenediamine, 2,2,4- or 2,4,4-trimethyl-1,6-hexamethylenediamine, 2-aminopropylcyclohexylamine, 3(4)-aminomethyl-1-methylcyclohexylamine, 1,4-diamino-4-methylpentane, amine-terminated polyoxyalkylene polyols (known as Jeffamines) or amine-terminated polytetramethylene glycols.

The amines preferably have two primary amino groups, such as, for example, ethylenediamine, propylenediamine, 2,2-dimethyl-1,3-propanediamine, butylenediamine, pentanediamine, hexamethylenediamine, heptanediamine, octanediamine, nonanediamine, decanediamine, dodecanediamine, hexadecanediamine, tolylenediamine, xylylenediamine, diaminodiphenylmethane, diaminodicyclohexylmethane, phenylenediamine, cyclohexylenediamine, diaminodiphenyl sulfone, isophoronediamine, bis (aminomethyl)cyclohexane, 2-butyl-2-ethyl-1,5-pentamethylenediamine, 2,2,4- or 2,4,4-trimethyl-1,6-hexamethylenediamine, 2-aminopropylcyclohexylamine, 3(4)-aminomethyl-1-methylcyclohexylamine, 1,4-diamino-1 methylpentane, amine-terminated polyoxyalkylene polyols (known as Jeffamines) or amine-terminated polytetramethylene glycols.

Particular preference is given to butylenediamine, pentanediamine, hexamethylenediamine, tolylenediamine, xylylenediamine, diaminodiphenylmethane, diaminodicyclohexylmethane, phenylenediamine, cyclohexylenediamine, diaminodiphenyl sulfone, isophoronediamine, bis (aminomethyl)cyclohexane, amine-terminated polyoxyalkylene polyols (known as Jeffamines) or amine-terminated polytetramethylene glycols.

Suitable amines having three or more primary and/or secondary amino groups which are reactive toward a carbonate or carbamate group are for example tris(aminoethyl)amine, tris(aminopropyl)amine, tris(aminohexyl)amine, trisaminohexane, 4-aminomethyl-1,8-octamethylenediamine, trisaminononane, bis(aminoethyl)amine, bis(aminopropyl)amine, bis(aminobutyl)amine, bis(aminopentyl)amine, bis(aminohexyl)amine, N-(2-aminoethyl)propanediamine, melamine, oligomeric diaminodiphenylmethanes, N,N-bis(3-aminopropyl)ethylenediamine, N,N'-bis(3-aminopropyl)butanediamine, N,N,N',N'-tetra(3-aminopropyl)ethylenediamine, N,N,N',N'-tetra(3-aminopropyl)butylenediamine, amine-terminated polyoxyalkylenepolyols with a functionality of three or more (known as Jeffamines), polyethyleneimines with a functionality of three or more, or polypropyleneimines with a functionality of three or more.

Preferred amines having three or more reactive primary and/or secondary amino groups are tris(aminoethyl)amine, tris(aminopropyl)amine, tris(aminohexyl)amine, trisaminohexane, 4-aminomethyl-1,8-octamethylenediamine, trisaminononane, bis(aminoethyl)amine, bis(aminopropyl)amine, bis(aminobutyl)amine, bis(aminopentyl)amine, bis(aminohexyl)amine, N-(2-aminoethyl)propanediamine, melamine or amine-terminated polyoxyalkylene polyols having a functionality of three or more (known as Jeffamines).

Particular preference is given to amines having three or more primary ado groups, such as tris(aminoethyl)amine, tris(aminopropyl)amine, tris(aminohexyl)amine, trisaminohexane, 4-aminomethyl-1,8-octamethylenediamine, trisaminononane or amine-terminated polyoxyalkylene polyols having a functionality of three or more (known as Jeffamines).

It will be appreciated that mixtures of said amines can also be used.

In general not only amines having two primary or secondary amino groups but also amines having three or more primary or secondary amine groups are used. Amine mixtures of this kind can also be characterized by the average amine functionality, with unreactive tertiary amino groups disregarded. Thus for example an equimolar mixture of a diamine and a triamine has an average functionality of 2.5. Preference is given to the reaction in accordance with the invention of amine mixtures in which the average amine functionality is from 2.1 to 10, in particular from 2.1 to 5.

The reaction of the carbonate with the diamine or polyamine to form the high-functionality highly branched polyurea of the invention is accompanied by elimination of the alcohol or phenol bound in the carbonate. If one molecule of carbonate reacts with two amino groups then two molecules of alcohol or phenol are eliminated and one urea group is formed. If one molecule of carbonate reacts with only one amino group then a carbamate group is formed with elimination of a molecule of alcohol or phenol.

The reaction of the carbonate or carbonates with the amine or amines can take place in a solvent. In that case it is possible in general to use any solvents which are inert toward the respective reactants. Preference is given to working in organic solvents, such as decane, dodecane, benzene, toluene, chlorobenzene, dichlorobenzene, xylene, dimethylformamide, dimethylacetamide or solvent naphtha.

In one preferred embodiment of the process of the invention the reaction is carried out in bulk, i.e., without inert solvent. The alcohol or phenol liberated during the reaction between amine and carbonate or carbamate can be separated off by distillation, where appropriate under reduced pressure, and thus removed from the reaction equilibrium. This also accelerates the reaction.

In order to accelerate the reaction between amine and carbonate or carbamate it is also possible to add catalysts or catalyst mixtures. Suitable catalysts are generally compounds which catalyze the formation of carbamate or urea, examples being alkali metal or alkaline earth metal hydroxides, alkali metal or alkaline earth metal hydrogen carbonates, alkali metal or alkaline earth metal carbonates, tertiary amines, ammonium compounds, or organic compounds of aluminum, tin, zinc, titanium, zirconium or bismuth. By way of example it is possible to use lithium, sodium, potassium or cesium hydroxide, lithium, sodium, potassium or cesium carbonate, diazabicyclooctane (DABCO), diazabicyclononene (DBN), diazabicycloundecene (DBU), imidazoles, such as imidazole, 1-methylimidazole, 2-methylimidazole, and 1,2-dimethylimidazole, titanium tetrabutoxide, dibutyltin oxide, dibutyltin dilaurate, tin dioctoate, zirconium acetylacetonate or mixtures thereof.

The addition of the catalyst is made generally in an amount of from 50 to 10 000 ppm, preferably from 100 to 5000 ppm, by weight based on the amount of amine used.

Following the reaction, in other words without further modification, the high-functionality highly branched polyureas prepared by the process of the invention are terminated with either amino groups or carbamate groups. They dissolve readily in polar solvents, such as in water, alcohols, such as methanol, ethanol, butanol, alcohol/water mixtures, dimethylformamide, dimethylacetamide, N-methylpyrrolidone, ethylene carbonate or propylene carbonate.

A high-functionality polyurea for the purposes of the invention is a product which has urea groups and also at least three, preferably at least six, in particular at least ten functional groups. There is in principle no upper limit on the number of functional groups, although products with a very large number of functional groups may exhibit unwanted properties, such as a high viscosity or a poor solubility. The high-functionality polyureas of the present invention generally do not have more than 200 functional groups, preferably not more than 100 functional groups. By functional groups here are meant primary, secondary or tertiary amino groups or carbamate groups. In addition it is possible for the high-functionality highly branched polyurea to contain further functional groups, which do not participate in the synthesis of the highly branched polymer (see below). These additional functional groups can be introduced by means of diamines or polyamines which contain further functional groups in addition to primary and secondary amino groups.

In the test below the synthesis of the novel high-functionality highly branched polyureas is illustrated in principle.

In the case of the preparation of the high-functionality polyureas the ratio of amines having at least two amino groups which are reactive with carbonate or carbamate groups to the dicarbonate can be set so that the resultant most simple condensation product (referred to below as condensation product (A)) contains on a average either one carbamate group and more than one amino group which is reactive with the carbamate group or else contains one amino group which is reactive with carbamate groups, and more than one carbamate group. The simplest structure arising for the condensation product (A) of a dicarbonate and a diamine or polyamine comprises the arrangements $XY_n$ or $X_nY$, where n is generally a number between 1 and 6, preferably between 1 and 4, more preferably between 1 and 3. X denotes a carbamate group, Y an amino group reactive therewith. The reactive group, which in this case is present as a single group, is referred to in the text below as "focal group".

If, for example, in the preparation of the simplest condensation product (A) from a carbonate and a difunctional amine the molar ratio is 1:1, then the result on average is a molecule of type XY, illustrated by the general formula 1.

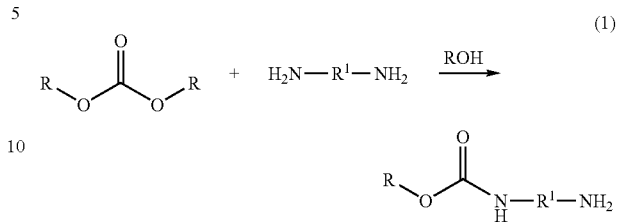

R and $R^1$ here can be any desired aliphatic, aromatic or araliphatic radicals.

The preparation of the condensation product (A) from a dicarbonate and a trifunctional amine at a molar ratio of 1:1 results on average in a molecule of type $XY_2$, illustrated by the general formula 2. The focal group in this case is a carbamate group.

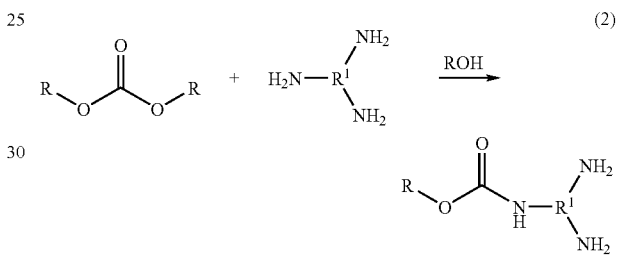

In the preparation of the condensation product (A) from a carbonate and a tetrafunctional amine, again with the molar ratio at 1:1, the result is on average a molecule of type $XY_3$, illustrated by the general formula 3. The focal group in this case is again a carbamate group.

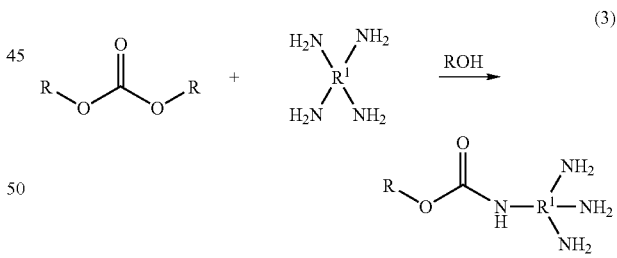

If a carbonate is reacted with a triamine and the molar ratio of carbonate to triamine is 2:1, the result is on average a simplest condensation product (A) of type $X_2Y$, Which is illustrated by the general formula 4. The focal group in this case is an amino group.

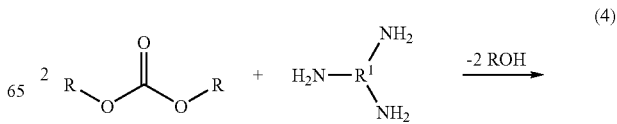

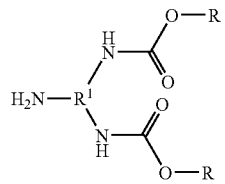

If difunctional compounds are additionally added to the components, such as a carbonate or a diamine, for example, the effect of this is to increase the length of the chains, as illustrated for example in formula 5. The result is again on average a molecule of type $XY_2$; the focal group is a carbamate.

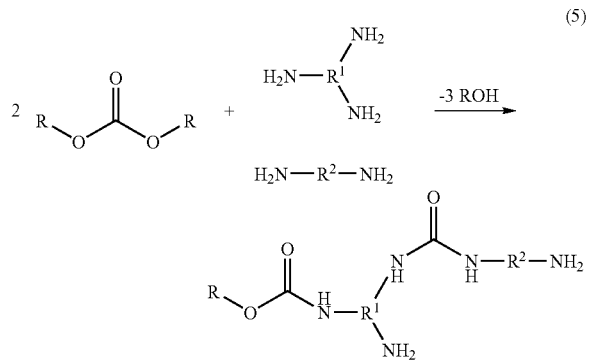

The simple condensation products (A) described by way of example in formulae 1-5 react intermolecularly to form high-functionality polycondensation products, called polycondensation products (P) below. The reaction to the condensation product (A) and to the polycondensation product (P) takes place normally at a temperature of from 0 to 250° C., preferably at from 60 to 160° C., without solvent or in solution.

In view of the nature of the condensation products (A) it is possible that the condensation reaction may result in polycondensation products (P) having a variety of structures which contain branching but no crosslinking. Furthermore, the polycondensation products (P) contain either a carbamate focal group and more than two amines which are reactive with carbonate or carbamate groups, or else contain as focal group an amine which is reactive with carbonate or carbamate groups, and more than two carbamate groups. The number of reactive groups is a function of the nature of the condensation products (A) employed and of the degree of polycondensation.

For example, a condensation product (A) may react in accordance with the general formula 2 by threefold intermolecular condensation to form two different polycondensation products (P), which are reproduced in the general formulae 6 and 7.

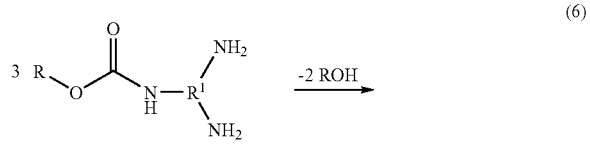

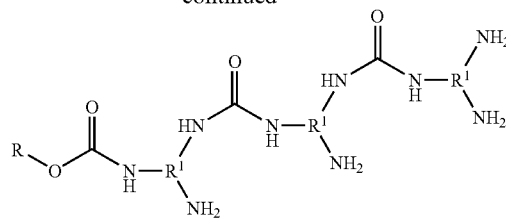

In formulae 2-7 R and $R^1$ can be any desired aliphatic, aromatic or araliphatic radicals.

For terminating the intermolecular polycondensation reaction there are a variety of options. For example, the temperature can be lowered to a range within which the reaction comes to a standstill and the product (A) or the polycondensation product (P) is storage-stable.

In a further embodiment it is possible to terminate the reaction by adding a product containing groups reactive toward the focal group of (P) to the product (P) as soon as, by virtue of the intermolecular reaction of the condensation product (A), a polycondensation product (P) is present which has the desired degree of polycondensation. Thus in the case where the focal group is a carbamate group a monoamine, diamine or polyamine can be added, for example. In the case of an amine focal group a mono-, di- or polyurethane, a mono-, di- or polyisocyanate, an aldehyde, a ketone or an acid derivative which is reactive with amine can be added to the product (P).

Additionally it is also possible to control the intermolecular polycondensation reaction either by adding the appropriate catalyst or by choosing a suitable temperature. Moreover, the average molecular weight of the polymer (P) can be adjusted by way of the composition of the starting components and by way of the residence time. The condensation products (A) and the polycondensation products (P) which were prepared at elevated temperature are normally stable over a relatively long period of time at room temperature.

The preparation of the high-functionality highly branched polyureas of the invention takes place in general within a pressure range from 0.1 mbar to 20 bar, preferably from 3 mbar to 3 bar, in reactors or reactor cascades which are operated batchwise, semicontinuously or continuously.

As a result of the aforementioned setting of the reaction conditions and, where appropriate, the choice of appropriate solvent it is possible for the products of the invention to be processed further following their preparation, without additional purification.

In another preferred embodiment the polyureas of the invention may contain other functional groups. Functionalization can in that case be effected during the reaction of the carbonate with the amine or amines, in other words during the polycondensation reaction which produces the increase in molecular weight, or else after the end of the polycondensation reaction, by subsequent functionalization of the resulting polyureas.

If before or during the molecular weight build-up components are added which as well as amino groups or carbamate groups contain further functional groups, then the product is a polyurea having randomly distributed further—that is, other than the carbamate groups or amino groups—functional groups.

By way of example, before or during the polycondensation, components can be added which in addition to amino groups or carbamate groups contain hydroxyl groups, mercapto groups, tertiary amino groups, ether groups, carboxyl groups, sulfonic acid groups, phosphonic acid groups, silane groups, siloxane groups, aryl radicals or long-chain alkyl radicals.

Hydroxyl-containing components which can be added to the functionalization include for example ethanolamine, N-methylethanolamine, propanolamine, isopropanolamine, butanolamine, 2-amino-1-butanol, 2-(butylamino)ethanol, 2-(cyclohexylamino)ethanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane or tris(hydroxyethyl)aminomethane.

Mercapto-containing components which can be used for functionalization include, for example cysteamine. With tertiary amino groups it is possible to functionalize the highly branched polyureas through the use, for example, of N-methyldiethylenetriamine or N,N-dimethylethylenediamine. With ether groups it is possible to functionalize the highly branched polyureas by using amine-terminated polyetherols (known as Jeffamines). With acid groups it is possible to functionalize the highly branched polyureas through the use, for example, of aminocarboxylic acids, aminosulfonic acids or aminophosphonic acids. With groups containing silicon it is possible to functionalize the highly branched polyureas through the use of hexamethyldisilazane. With long-chain alkyl radicals the highly branched polyureas can be functionalized by using alkylamines or alkylisocyanates having long-chain alkyl radicals.

The polyureas can also be functionalized, furthermore, by using small amounts of monomers which contain functional groups different from amino groups or carbamate groups. Mention may be made here by way of example of alcohols with a functionality of two, three or more, which can be incorporated into the polyurea by way of carbonate or carbamate functions. Thus, for example, hydrophobic properties can be obtained by adding long-chain alkanediols, while polyethylene oxide diols or triols produce hydrophilic properties in the polyurea.

The said functional groups other than amine, carbonate or carbamate groups which are introduced before or during the polycondensation are generally introduced in amounts of from 0.1 to 80 mol %, preferably in amounts of from 1 to 50 mol %, based on the sum of the amino, carbamate, and carbonate groups.

Subsequent functionalization of high-functionality highly branched polyureas containing amino groups can be achieved for example by adding molecules containing acid groups, isocyanate groups, keto groups or aldehyde groups or molecules containing activated double bonds, acrylic double bonds for example. By way of example it is possible to obtain polyureas containing acid groups by reaction with acrylic acid or maleic acid and derivatives thereof, with subsequent hydrolysis if desired.

Additionally it is possible to convert high-functionality polyureas containing amino groups into high-functionality polyurea polyols by reaction with alkylene oxides, for example ethylene oxide, propylene oxide or butylene oxide.

The formation of salts with protic acids or quaternization of the amino functions with alkylating reagents, such as methyl halides or dialkyl sulfates, allows the high-functionality, highly branched polyureas to be adjusted water-solubly or water-emulsifiably.

In order to achieve hydrophobicization it is possible for amine-terminated high-functionality highly branched polyureas to be reacted with saturated or unsaturated long-chain carboxylic acids, their derivatives that are reactive toward amine groups, or else aliphatic or aromatic isocyanates.

Polyureas terminated with carbamate groups can be obtained by reaction with long-chain alkyl amines or long-chain aliphatic monoalcohols.

A great advantage of the process of the invention is its economy. Not only the reaction to form the polycondensate (A) or polycondensation product (P) but also the reaction of (A) or (P) to form polyureas with further functional groups can take place in one reaction apparatus, which is an advantage both technically and economically.

The present invention also provides for the use of the high-functionality highly branched polyureas of the invention as adhesion promoters and thixotropic agents and as components for producing paints and varnishes, coatings, adhesives, sealants, castable elastomers, and foams.

The present invention is illustrated by the following examples:

EXAMPLES

General Procedure:

The amine or the amine mixture, dialkyl carbonate, and catalyst (ppm based on mass of amine) were introduced together in accordance with table 1 into a three-necked flask equipped with stirrer, reflux condenser, and internal thermometer, and the mixture was heated at 145° C. As the duration of the reaction progressed there was a reduction in the temperature of the reaction mixture, owing to the ensuing evaporative cooling of the liberated monoalcohol, to about 125-135° C. After 3 hours of reaction under reflux the reflux condenser was exchanged for a descending condenser, the monoalcohol was distilled off, and the temperature of the reaction mixture was slowly raised to 155° C. After the end of the evolution of alcohol the reaction mixture was cooled to room temperature and then analyzed by gel permeation chromatography using a refractometer as the detector. The mobile phase used was hexafluoroisopropanol, with polymethyl methacrylate (PMMA) as the standard for determining the molecular weight.

TABLE 1

Starting materials and analytical data

| Example | Amine | Carbonate | Molar ratio amine:carbonate | Catalyst (ppm) | Molar mass (Mn) | Molar mass (Mw) |
| --- | --- | --- | --- | --- | --- | --- |
| 1 | TAEA | DEC | 1:1 | DBTL (1000) | 5400 | 16600 |
| 2 | DETA | DMC | 1:1 | DBTL (1000) | 1700 | 2200 |

TABLE 1-continued

Starting materials and analytical data

| Example | Amine | Carbonate | Molar ratio amine:carbonate | Catalyst (ppm) | Molar mass (Mn) | Molar mass (Mw) |
|---|---|---|---|---|---|---|
| 3 | TAEA | DEC | 1:2 | DBTL (1400) | 2400 | 3600 |
| 4 | TAEA | DMC | 1:1 | $K_2CO_3$ (1400) | 1600 | 2400 |
| 5 | TAEA/ DAPMA molar 1:1 | DEC | 1:1 | DBTL (1200) | 6500 | 22800 |
| 6 | DETA/ HDA molar 1:1 | DEC | 1:1 | DBTL (1200) | 1200 | 1700 |
| 7 | TAEA/ IPDA molar 1:1 | DEC | 1:1 | $K_2CO_3$ (1200) | 1600 | 2400 |
| 8 | TAEA/ HDA molar 1:1 | DEC | 1:1 | $K_2CO_3$ (1200) | 1900 | 2800 |

TAEA: tris(aminoethyl)amine
DETA: diethylenetriamine
DAPMA: di(aminopropyl)methylamine
HDA: hexamethylenediamine
IPDA: isophoronediamine
DEC: diethyl carbonate
DMC: dimethyl carbonate
DBTL: dibutyltin dilaurate

What is claimed is:

1. A process for preparing non-crosslinked high-functionality branched polyureas which comprises reacting one or more carbonates with one or more amines having at least two primary and/or secondary amino groups, at least one amine having at least three primary and/or secondary amino groups, wherein the average amine functionality of the amines excluding unreactive tertiary amino groups is from 2.1 to 5, comprising the steps of:
   (i) reacting the one or more carbonates with the one or more amines to yield condensation products (A) comprising one carbamate group and from 1 to 4 amino groups reactive with a carbamate group, or one amine group reactive with a carbamate group and from 1 to 4 carbamate groups, and
   (ii) reacting intermolecularly the condensation products (A) to form a polycondensation products (P) comprising both carbamate and amino groups, the polycondensation products (P) containing branching but no crosslinking.

2. A process according to claim 1, wherein amines having two primary and/or secondary amino groups are reacted, these amines being selected from the group consisting of ethylenediamine, N-alkylethylenediamine, propylenediamine, 2,2-dimethyl-1,3-propanediamine, N-alkylpropylenediamine, butylenediamine, N-alkylbutylenediamine, pentanediamine, hexamethylenediamine, N-alkylhexamethylenediamine, heptanediamine, octanediamine, nonanediamine, decanediamine, dodecanediamine, hexadecanediamine, tolylenediamine, xylylenediamine, diaminodiphenylmethane, diaminodicyclohexylmethane, phenylenediamine, cyclohexylenediamine, bis(aminomethyl)cyclohexane, diaminodiphenyl sulfone, isophoronediamine, 2-butyl-2-ethyl-1,5-pentamethylenediamine, 2,2,4- or 2,4,4-trimethyl-1,6-hexamethylenediamine, 2-aminopropylcyclohexylamine, 3(4)-aminomethyl-1-methylcyclohexylamine, 1,4-diamino-4-methylpentane, amine-terminated polyoxyalkylene polyols and amine-terminated polytetramethylene glycols.

3. A process according to claim 1, wherein the at least one amine having at least three primary and/or secondary amino groups is selected from the group consisting of bis(aminoethyl)amine, bis(aminopropyl)amine, bis(aminobutyl)amine, tris(aminoethyl)amine, tris(aminopropyl)amine, tris(aminohexyl)amine, trisaminohexane, 4-aminomethyl-1,8-octamethylenediamine, trisaminononane, N-(2-aminoethyl)propanediamine, N,N'-bis(3-aminopropyl)ethylenediamine, N,N'-bis(3-aminopropyl)butanediamine, N,N,N'N'-tetra(3-aminopropyl)ethylenediamine, N,N,N',N'-tetra(3-aminopropyl)butanediamine, melamine, oligomeric diaminodiphenylmethanes, amine-terminated polyoxyalkylene polyols with a functionality of three or more, polyethyleneimines with a functionality of three or more and polypropyleneimines with a functionality of three or more.

4. A process according to claim 1, wherein the carbonate is selected from the group consisting of ethylene carbonate, 1,2- or 1,3-propylene carbonate, diphenyl carbonate, ditolyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, diheptyl carbonate, dioctyl carbonate, didecyl carbonate, and didodecyl carbonate.

5. A process according to claim 1, wherein an amine or an amine mixture having an average amine functionality of 2.5 is reacted.

6. A process according to claim 1, wherein the reaction of the carbonate or carbonates with the amine or amines takes place in a solvent.

7. A process according to claim 6, wherein the solvent is selected from the group consisting of decane, dodecane, benzene, toluene, chlorobenzene, dichlorobenzene, xylene, dimethylformamide, dimethylacetamide, and solvent naphtha.

8. A process according to claim 1, wherein the reaction takes place in the absence of an inert solvent.

9. A high-functionality branched polyureas prepared by the process according to claim 1.

* * * * *

UNITED STATES PATENT AND TRADEMARK OFFICE
CERTIFICATE OF CORRECTION

PATENT NO. : 7,645,855 B2  Page 1 of 1
APPLICATION NO. : 10/578186
DATED : January 12, 2010
INVENTOR(S) : Bruchmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 646 days.

Signed and Sealed this

Twenty-eighth Day of December, 2010

David J. Kappos
*Director of the United States Patent and Trademark Office*